(12) United States Patent
Jacques et al.

(10) Patent No.: US 8,196,740 B2
(45) Date of Patent: Jun. 12, 2012

(54) BICYCLE TRAVEL/STORAGE BAG

(75) Inventors: Jean-François Jacques, Montreal (CA); Alexandre Lavallée, Montreal (CA)

(73) Assignee: SAC Nomad LTEE, Chicoutimi, Quebec (CA)

( * ) Notice: Subject to any disclaimer, the term of this patent is extended or adjusted under 35 U.S.C. 154(b) by 38 days.

(21) Appl. No.: 12/556,118

(22) Filed: Sep. 9, 2009

(65) Prior Publication Data

US 2010/0230311 A1    Sep. 16, 2010

Related U.S. Application Data

(63) Continuation of application No. PCT/CA2008/000430, filed on Mar. 6, 2008.

(60) Provisional application No. 60/893,942, filed on Mar. 9, 2007.

(51) Int. Cl.
*B65D 85/68* (2006.01)

(52) U.S. Cl. .................... 206/335; 206/577; 190/107

(58) Field of Classification Search .................. 206/304, 206/335, 304.2, 315.1, 481, 493, 478, 522, 206/521, 355; 150/167; 220/745; 190/107
See application file for complete search history.

(56) References Cited

U.S. PATENT DOCUMENTS

| | | | |
|---|---|---|---|
| 1,607,778 A * | 11/1926 | Noreau | 206/304 |
| 1,937,114 A * | 11/1933 | Hansen et al. | 29/521 |
| 2,254,578 A * | 9/1941 | O'Brien | 190/107 |
| 2,273,544 A * | 2/1942 | Vandervort | 206/335 |
| 3,743,564 A * | 7/1973 | Gross | 156/382 |
| 3,886,988 A | 6/1975 | Garrett | |
| 4,390,088 A * | 6/1983 | Brenner | 206/335 |
| 4,569,082 A * | 2/1986 | Ainsworth et al. | 383/3 |
| 4,756,416 A * | 7/1988 | Johnson | 206/335 |
| 4,792,039 A * | 12/1988 | Dayton | 206/304 |
| 4,892,190 A | 1/1990 | Delgado | |
| 4,944,340 A * | 7/1990 | Tortorich | 150/167 |
| 4,991,715 A | 2/1991 | Williams | |
| 6,209,599 B1 * | 4/2001 | Richardson | 150/167 |
| 6,405,771 B1 * | 6/2002 | Mote et al. | 150/167 |

FOREIGN PATENT DOCUMENTS

| | | |
|---|---|---|
| CA | 2163376 | 5/1997 |
| DE | 39 34 946 | 4/1991 |
| DE | 195 08 826 | 5/1996 |

* cited by examiner

*Primary Examiner* — Mickey Yu
*Assistant Examiner* — Chun Cheung
(74) *Attorney, Agent, or Firm* — Norton Rose Canada LLP

(57) ABSTRACT

A bag (10) for transporting or storing a partly disassembled bicycle is provided in the form of a lightweight soft shell with strategically located rigid reinforcements. The bag (10) can be collapsed in a compact storage configuration when not in use while still providing added impact protection to the most vulnerable parts of the bicycle. Inflatable partitions (42) can be provided on either side of the bicycle frame to provide added protection while still allowing collapsing of the bag (10) when not in use. Hub attachments (18) can be provided on the side panels (16) of the bag (10) for securely holding the bicycle wheel by the hub thereof on the inner surface of the bag soft side panels (16).

25 Claims, 10 Drawing Sheets

BICYCLE TRAVEL/STORAGE BAG

RELATED APPLICATION(S)

This application is a continuation of International Patent Application No. PCT/CA2008/000430 filed on Mar. 6, 2008, which claims benefit of U.S. Patent Application No. 60/893,942 filed on Mar. 9, 2007, both of which are herein incorporated by reference.

FIELD OF THE INVENTION

The present invention relates to bicycle bags and, more particularly, to a bag for carrying or storing a partially disassembled bicycle.

BACKGROUND ART

Over the years various bicycle travel bags have been developed. The prior art attempts to combine the features of sufficient rigidity to afford proper protection to the bicycle, collapsible into smaller and easily storable packages, and lightweightedness for easy transportation have not been heretofore fully satisfactory. Furthermore, the positioning of the bicycle parts in the bags has often been somewhat complicated and not optimized.

SUMMARY

It is therefore an aim of the present invention to address the above mentioned concerns.

Therefore, in accordance with a general aspect, there is provided a bicycle travel/storage bag comprising a base having longitudinally extending left and right sides and front and rear ends, said base being provided on an inner surface thereof with at least one anchor for holding a bicycle frame in an upstanding position on the base, left and right panels extending respectively from said left and right sides of said base, a front panel extending from said front end of said base, and at least one fastener for selectively joining together said right, left and front panels together to close the bag, said left, right and front panels being deployable from a closed position to an open position in which at least the base, the right and left side panels all substantially lie in a same plane with said front panel extending forwardly from the front end of the base and said left and right panels extending respectively laterally from the left and right sides of the base, thereby substantially fully exposing an interior surface of the bag.

In accordance with a further general aspect, there is provided a bicycle travel/storage bag for receiving a bicycle in a partly disassembled condition, the bicycle having a pair of bicycle wheels and a bicycle frame, the bag comprising a base with a bicycle frame mount for securely holding the bicycle frame in an upstanding position, left and right side panels extending from opposed sides of the base, wheel attachments for holding the bicycle wheels on an inwardly facing side of said left and right side panels, and at least one cushion extending on opposed sides of the bicycle frame when the same is held in said upstanding position on said base, the at least one cushion acting as a bumper between the wheels carried on the inwardly facing sides of the right and left side panels and the bicycle frame.

In accordance with a further general aspect, there is provided a bicycle travel/storage bag comprising a base with a bicycle frame mount for securely holding a bicycle frame in an upstanding position, a pair of opposed soft side panels extending from opposed sides of the base, and at least two hub attachments for releasably securing the bicycle wheels by the hubs thereof to an inner side of at least one of said side panels.

In accordance with a further general aspect, there is provided a bicycle travel/storage bag comprising a substantially rigid base having left and right sides and front and rear ends, a substantially rigid front panel pivotally mounted to the front end of said substantially rigid base, left and right soft panels extending respectively from said left and right sides of said substantially rigid base, and a fastener for joining the front, left and right panels together, the left and right soft panels being collapsible for allowing said substantially rigid front panel to be pivoted towards said substantially rigid base in a compact collapsed configuration when the bag is not in use.

In accordance with a further general aspect, there is provided a bicycle travel/storage bag for transporting a bicycle in a partly disassembled condition with the wheels of the bicycle disconnected from the bicycle frame and the bicycle seat removed from the seat post; the bag comprising an enclosure for receiving the bicycle, the enclosure having a base provided with at least one mount for supporting the bicycle frame in an upstanding position, and a reversible pocket adapted to be pulled out of a top surface of the enclosure to provide additional space for accommodating bicycle frames with integrated seat post.

In accordance with a still further general aspect, there is provided a bicycle travel/storage bag for receiving a bicycle in a partly disassembled condition, the bicycle having a pair of bicycle wheels and a bicycle frame, the bicycle frame having a bottom bracket, a pair of front forks and rear dropouts, the bag comprising a substantially rigid base having opposed longitudinally extending side edges and front and rear edges, a fork mount provided at a front end of the base for holding the bicycle frame in a vertically upstanding position on an inner surface of the base, a cushioned pad provided on said inner surface of said base at a location between said front and rear edges and upon which the bottom bracket of the bicycle frame rest once the bicycle frame has been mounted to said fork mount, said cushioned pad being longitudinally over dimensioned relative to the bottom bracket in order to provide support to bottom bracket of bicycle frames of different sizes without having to reposition the cushioned pad between the front and rear edges.

BRIEF DESCRIPTION OF THE DRAWINGS

Reference will now be made to the accompanying drawings, showing by way of illustration a preferred embodiment of the present invention, and in which.

DESCRIPTION OF THE PREFERRED EMBODIMENTS

Figure 1:
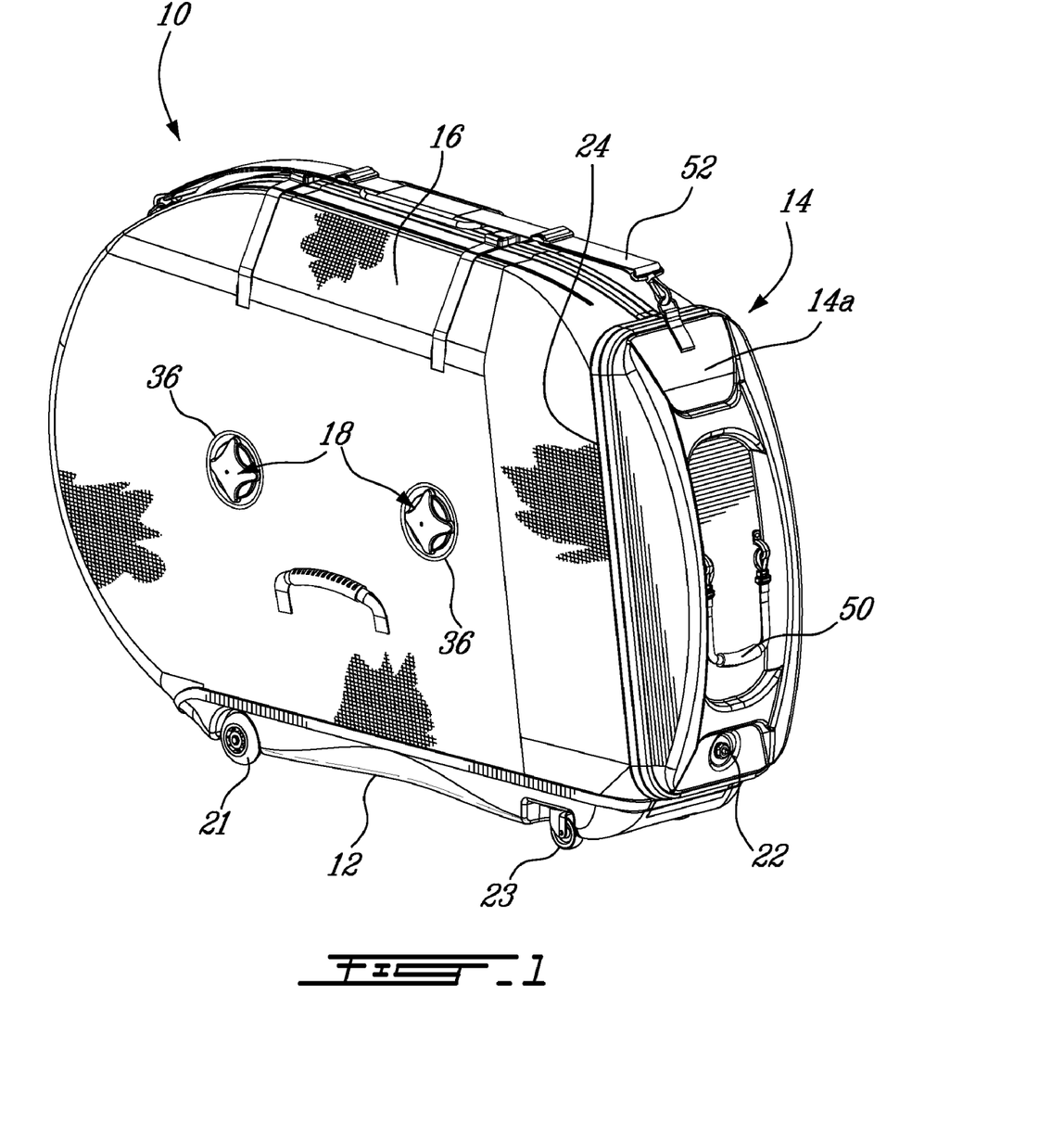
FIG. 1 is a perspective view of a bag for transporting and storing a partially disassembled bicycle.
Figure 2:
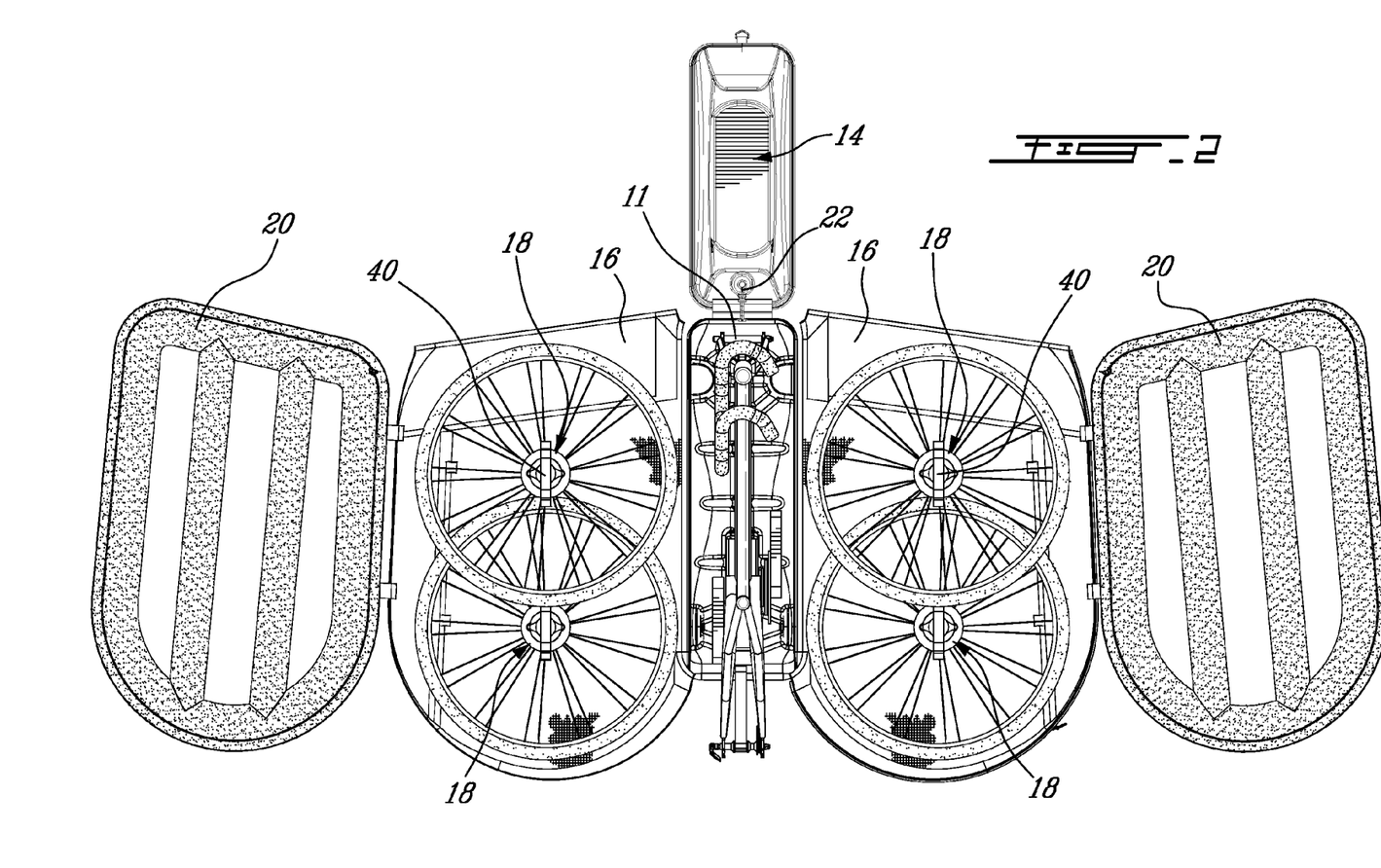
FIG. 2 is a top plan view of the bag shown in a fully open position with the partly disassembled bicycle placed therein.
Figure 6:
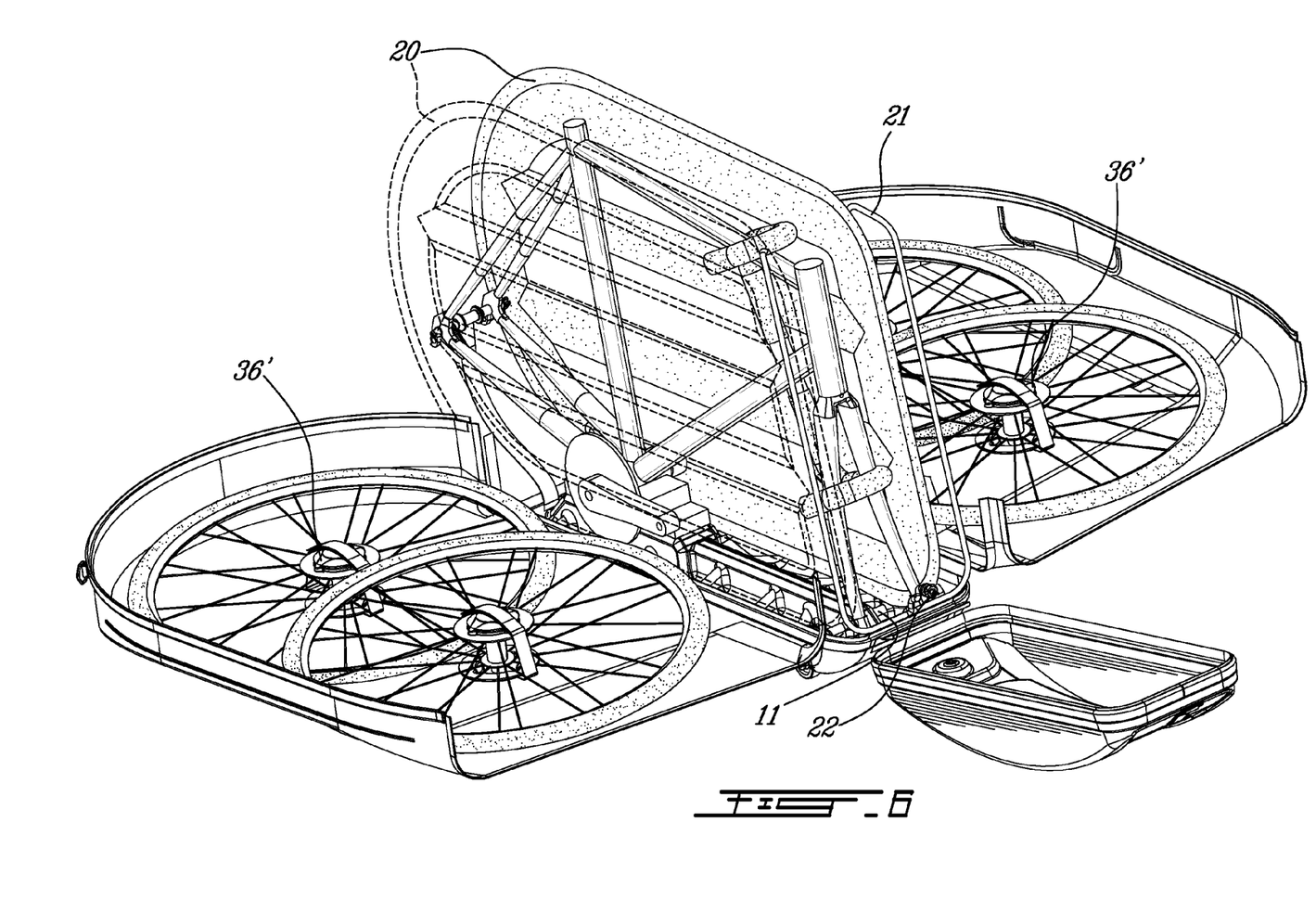
FIG. 6 is a front perspective view of the bag shown in a fully open position with inflatable partitions extending on either side of the bicycle frame mounted on the base of the bag.

FIG. 1 illustrates one embodiment of a bicycle travel/storage bag 10 suited for airline, train, bus and car travel. The bag 10 can also be used for indoor and outdoor storage. The bag 10 is adapted to completely enclose a wide variety of bicycles, including road, hybrid and mountain bikes as well as bicycle frame having integrated seat post (see FIG. 10). The bicycle needs only to be partly disassembled before being placed inside the bag 10. As shown in FIGS. 2 and 6, the user needs to remove the wheels, the seat or seat post, the stem with the handlebars (which remain connected to bicycle frame via the braking cables) from the bicycle frame.

The bag 10 is generally provided in the form of a lightweight soft shell with strategically located rigid reinforcements or inserts. In this way, the bag 10 can be collapsed in a compact storage configuration when not in use while still providing added impact protection to the most vulnerable parts of the bicycle. More particularly, the bag 10 comprises a generally rigid base 12, a front panel 14 with an arcuate rigid plate 14a and two opposed light-weight soft side panels 16. The side panels 16 are preferably made of a tear resistant fabric material and secured by any suitable means to the longitudinal sides of the base 12. The front panel 14 is hinged to the front end of the base 12 for pivotal movement about a horizontal axis towards and away from the base 12. The flexibility provided by the soft side panels 16 allows the front panel 14 to fold down against the base 12 in a compact collapsed storage configuration when the bag 10 is not in use. A fastener, such as a zipper 24, is provided for holding the front panel 14 and the side panels 16 together in a closed position. The zipper 24 runs along the side edges of the front panel 14, thereby allowing the same to be flipped up and down relative to the base 12 independently of the side panels 16 once the bag 10 has been unzipped. The zipper 24 also runs centrally along the top of the bag 10 down to a central portion of the rear edge of the base 12. This can be appreciated from FIGS. 1, 8 and 9.

As shown in FIGS. 2 and 6, the bag 10 can be fully opened to 360° by unzipping the bag 10 and flipping the soft side panels 16 and the front panel 14 in the plane of base 12 in a T-shaped configuration. The T-shaped opening configuration of the bag 10 with the two side panels 16 extending laterally from opposed sides of the base 12 and the front panel 14 extending forwardly from the front end of the base 12 in a substantially coplanar relationship advantageously provides full access to the interior surface of the bag 10 by completely exposing the inside surface of the base 12, the side panels 16 and the front panel 14. This provides for easy positioning of the bicycle parts in the bag 10. It is however understood that the forward pivotal movement of the front panel 14 in a direction away from the base 12 is not essential to have full access to the bicycle component anchoring points which are provided on the inner surfaces of the base 12 and side panels 14 of the bag 10.

Figure 3:
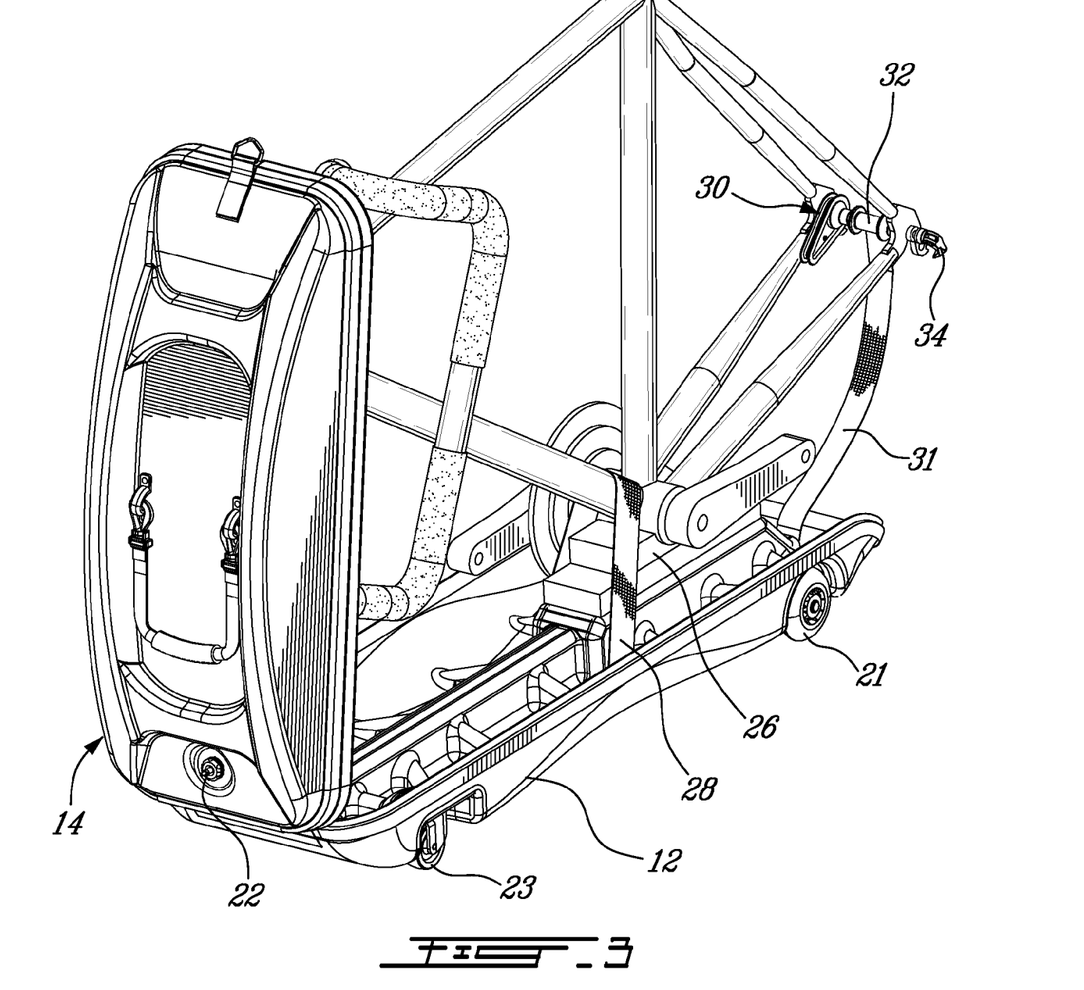
FIG. 3 is a front perspective view of the bag illustrating how a bicycle frame is supported in an upstanding position on the inner surface of the base of the bag, the side panels of the bag being omitted to show the positioning of the bottom bracket of the bicycle frame on a cushioned pad provided on the inner surface of the base of the bag.

The base 12 is preferably thermoformed from high molecular weight polyethylene (HMWPE) or the like. In some instances, it can also be provided in the form of a combination of soft and rigid components. For instance, the base could comprise a soft bottom panel mounted on a rigid inner frame. A pair of rear wheels 21 and a pair of front wheels 23 are provided on the underside of the rigid base 12 to facilitate transportation of the bag 10. The front wheels 23 are preferably of the swivel type. A front mount 11 (see FIGS. 2 and 6) is provided at the front inner side of the base 12 for releasable locking engagement with the front fork of the bicycle frame. The front mount 11 can be provided in the form of an axle carried by a U-shaped bracket secured to the base 12. The axle has a diameter similar to the standard axle diameter so that the axle can likewise be received in the slots defined in the end of the front fork of the bicycle frame. A quick-release mechanism, similar to the ones used to fasten bicycle wheels to associated forks, is provided at one end of the axle to secure the front fork to the axle and the U-shaped bracket. This allows to securely position the bicycle frame in a vertical upright position on base 12 as shown in FIGS. 2, 3 and 6. As shown in FIG. 3, a cushioned pad 26 is provided on the inner surface of the base 12 rearwardly of the front mount 11 for providing a surface upon which the bottom bracket of the bicycle can rest to protect the bicycle crank set against impacts during transportation. The cushioned pad 26 is preferably provided in the form of a rectangular block of rubber material having a length which is oversized relative to the bottom bracket in order to accept bicycle frames having different front fork and bottom bracket spacing. In this way, the cushioned pad 26 does not have to be slid rearwardly or forwardly to lie directly under the bicycle frame bottom bracket once the front fork thereof has been securely mounted to the front mount 11 on the base 12. A strap 28 is preferably provided to hold the bottom bracket firmly against the cushioned pad 26. The strap 28 can be permanently attached at one end thereof to the base 12 and a fastener, such as hook and loop fasteners (e.g. VELCRO™) can be provided at the other end thereof for releasable attachment to the base 12. In use, the strap 28 is passed over the lower end of the diagonal tube of the bicycle frame next to the bottom bracket and then fastened to the base 12 under sufficient tension to firmly hold the bottom bracket against the cushioned pad 26.

Figure 4:
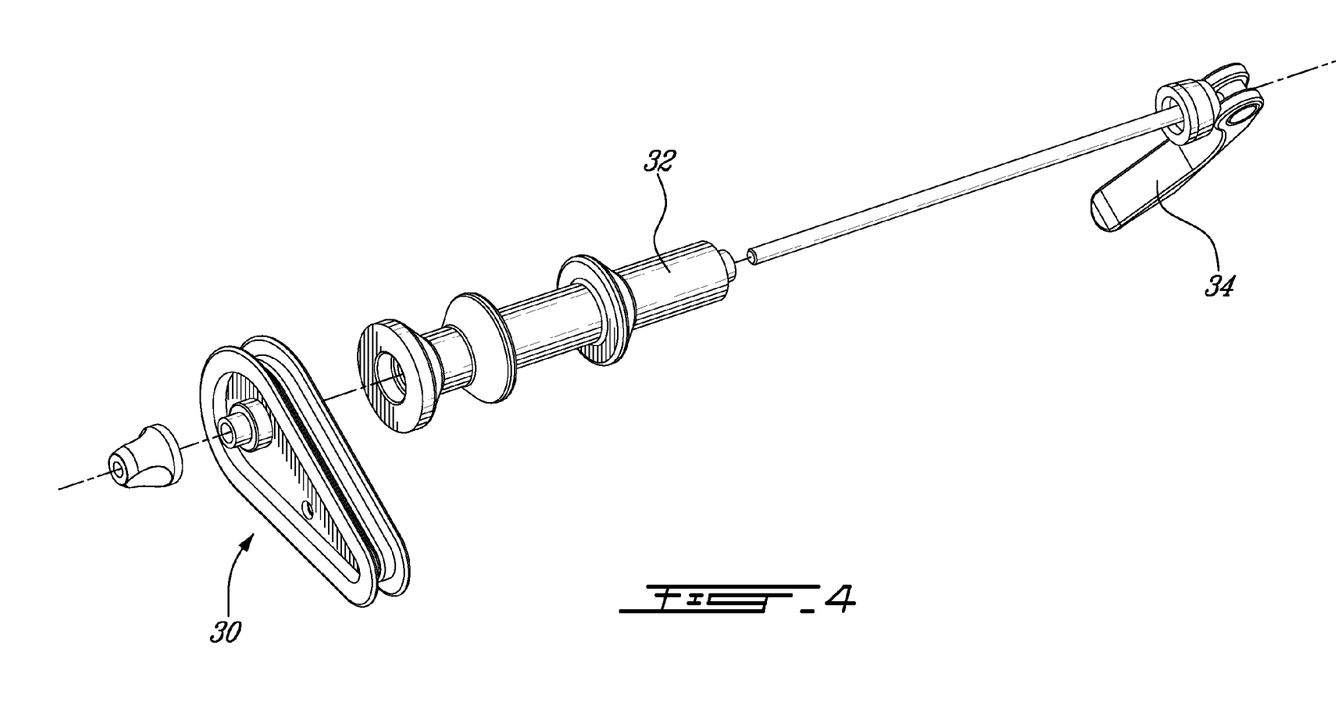
FIG. 4 is an exploded perspective view of an axle equipped with a chain tensioner for maintaining the chain of the bicycle under tension when the bicycle is mounted inside the bag.

As can be seen from FIGS. 3 and 4, the bag 10 is equipped with a chain keeper 30 in order to maintain the bicycle chain under tension during transportation. The chain keeper 30 is mounted to one end of an axle 32 adapted to be engaged in the slots defined in the rear drop outs of the bicycle frame. A conventional quick release mechanism 34 is provided at the other end of the axle 32 for securing the axle 32 in position on the rear drop outs after the chain keeper 30 has been engaged with the chain. The chain keeper 32 can be similar to the one manufactured by the Pedro company under part number 640056. A strap 31 is preferably used to attach the axle 32 and, thus, the chain keeper 30 to the base 12 or side panels 16 of the bag 10 in order to prevent the axle 32 and the chain keeper 34 from being lost.

Figure 5:
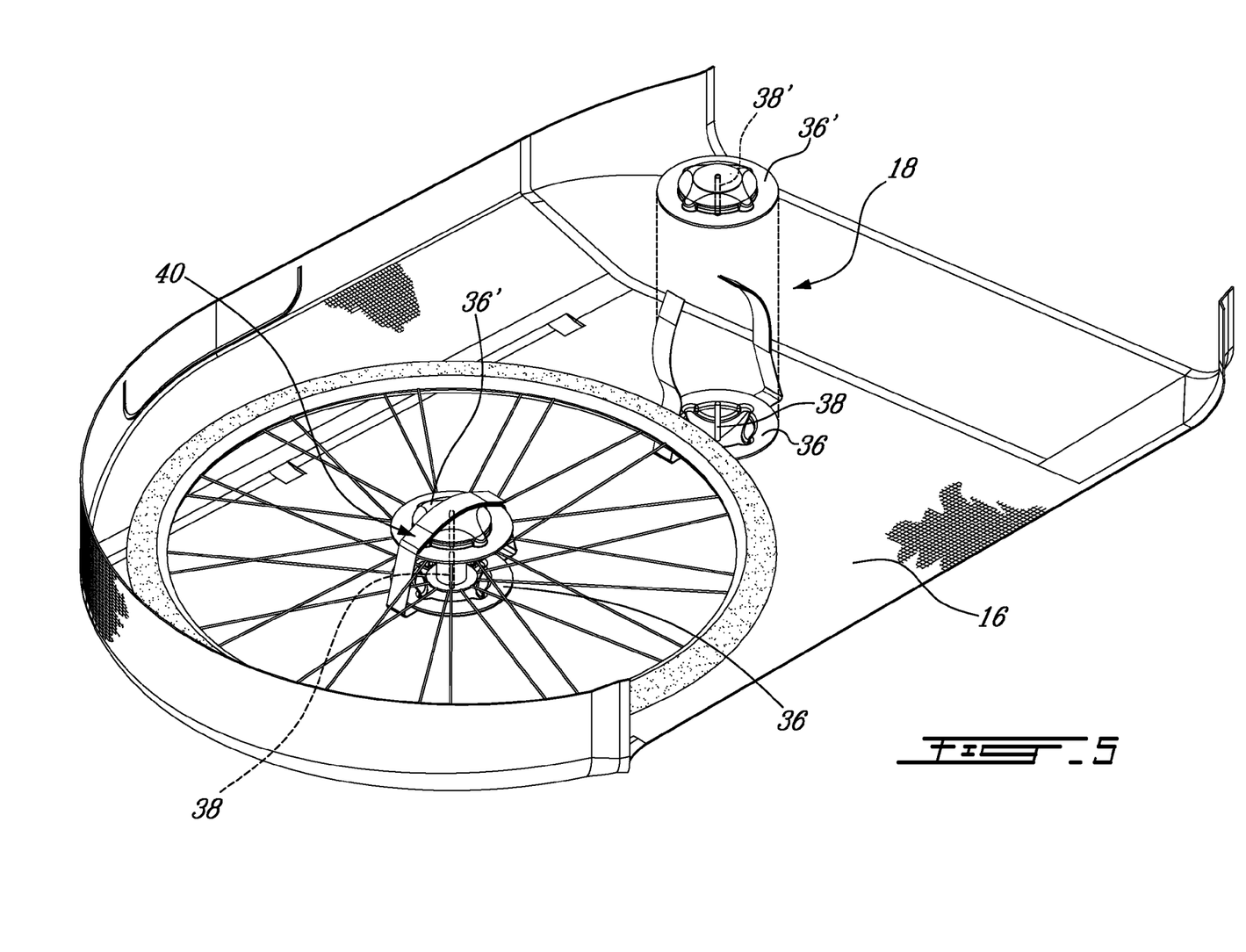
FIG. 5 is an enlarged perspective view of a side panel showing a hub attachment for securing the bicycle wheels by the hub thereof to an inner surface of the side panel.

As shown in FIGS. 2, 5, 6 and 7, the bag 10 is adapted to accommodate two pairs of wheels. Each soft side panel 16 is provided with two hub attachments 18 spaced from each other for carrying two wheels in overlapping relationship. Each hub attachment 18 comprises a first rigid plate or cap 36 integrated to a corresponding one of the side panels 16. The cap 36 is fixed to the side panel 16 by any appropriate means. The cap 36 is typically circular and sized to cover the hub of a wheel. The cap 36 can be made of plastic or other suitable material to prevent the hub of the wheels from puncturing and tearing the soft side panel 16. A pin 38 extends at right angles from the cap 36 inwardly of the bag 10 for engagement in the hub of the wheel. Accordingly, a wheel can be readily placed at a predetermined location on an inner surface of one of the side panels 16 by simply lowering the wheel over the pin 38 such that the pin 38 becomes engaged in the hub. It is understood that the pin 38 is sized to have a diameter slightly less than the diameter of the through bore passage of the wheel hub. Movement of the wheel on the inner surface of the side panel is substantially prevented by the engagement of the pin 38 in the hub. Once the wheel has been lowered in position over the inwardly projecting pin 38, a second similar cap 36' is placed over the hub of the wheel has shown in FIG. 6. The pin 38' of the second cap is inserted into the through bore passage of the wheel hub by the opposed end of the hub. In this way, the hub of the wheel is held in sandwich between the first and second caps 36 and 36'. The second cap 36' can be secured in position over the hub of the wheel by an appropriate strap and hook and loop arrangement 40 provided on the inner surface of the side panel 16 as shown in FIG. 5. The first and second caps 36 and 36' afford protection to the hub of the wheel and also protect the other parts of the bicycle frame and the bag 10 from being damaged by the wheel hubs. The caps 36 could be removably attached to the side panels 16. It is also noted that other types of wheel attachment or anchoring features could be used to retain the wheels in position on the inner surface of the side panels of the bag 10.

Figure 7:
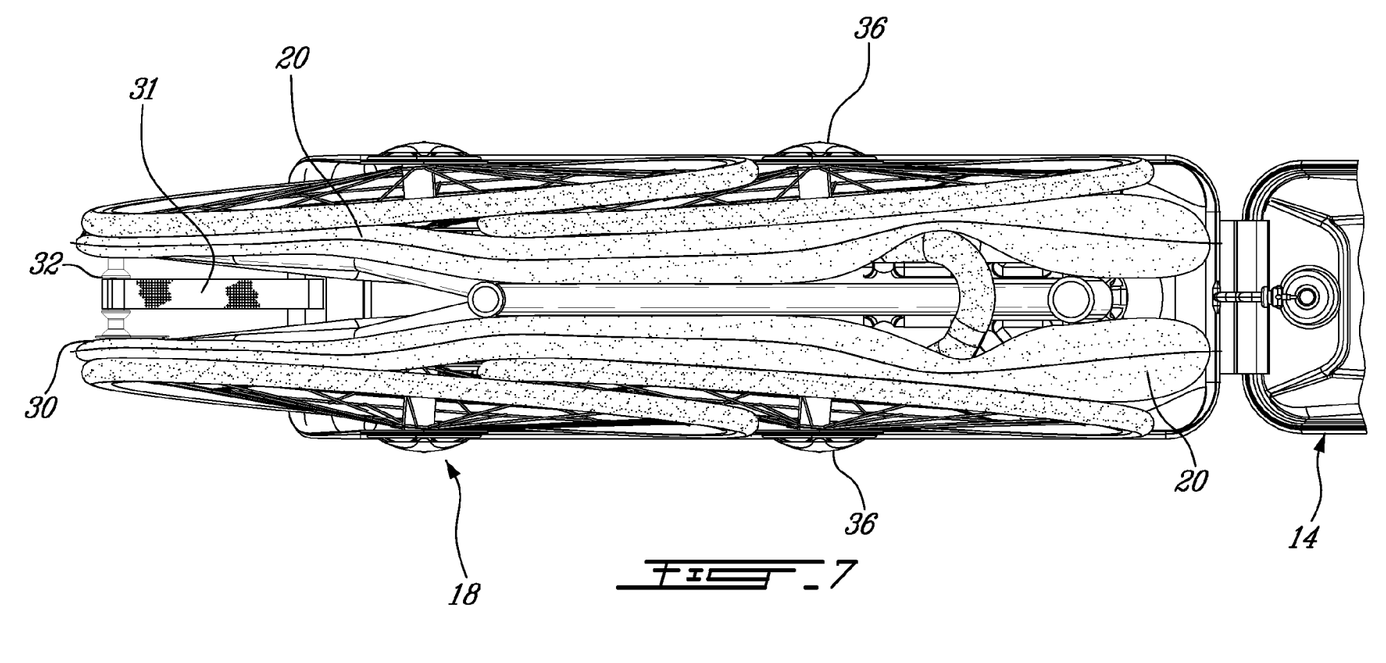
FIG. 7 is a top view of the bag illustrating the disposition of the inflatable partitions relative to the bicycle frame and the wheels in the bag.

As shown in FIGS. 2, 6 and 7 the bag 10 is further provided with a pair of inflatable partitions 20 adapted to be inflated on opposed sides of the bicycle frame, in order to fill the inner space of the bag between the wheels and the bicycle frame. A retractable valve 22 is provided on the front panel 14 for allowing the inflatable partitions 20 to be inflated from outside of the bag, once the bag has been closed, using a standard bicycle pump. The inflatable partitions 20 could be provided in the form of a single inflatable cushion having a U-shaped configuration for embracing the opposed sides of the bicycle frame. The inflatable structure acts as a bumper to provide added protection to the bicycle frame and the parts mounted thereto. As shown in FIG. 2, the inflatable partitions 20 can be pivotally attached to the side panels 16 and folded over the bicycle wheels secured to the inner surface of the side panels 16 in order to provide the desired cushion effect between the bicycle frame and the wheels. Alternatively, as shown in FIG. 6, the inflatable partitions 20 can be provided in the form of air bags loosely mounted in the bag 10 and attached thereto via the air line 21 extending from the valve 22. The inflatable partitions 20 can be provided in the form of panels having a height and a length generally corresponding to that of the side panels 16 of the bag 10. Alternatively, the inflatable partitions could be provided in form of an inflatable pouch configured to receive one of the wheels and the bicycle frame in the bag 10. In fact, the inflatable structure could have various configurations as long as it provided protections to the mains components of the bicycle being carried. According to a further embodiment, the partitions on either sides of the bicycle frame could be provided in the form of foam cushions or the like.

The bag is preferably also provided with a fabric internal sleeve or pocket (not shown) sized to accommodate the stem of the bicycle. Accordingly, once the stem has been removed from the bicycle frame, the protective sleeve is fitted over the stem to prevent the stem of the bicycle frame from being damaged. A tie-strap can be attached to the stem protective sleeve for attaching the stem and the handlebar on one side of the bicycle frame. The tie-strap is preferably provided with VELCRO™ for easy attachment. The stem protective sleeve can also be attached to the inside of the bag by any appropriate straps or the like.

Various pouches or pockets can be integrated to the side panels 16 and the base 12 for receiving various bicycle accessories. Also, the base 12 can be molded with integral tool holding compartments on the inner surface thereof. Handles 50 and a shoulder strap 52 (FIGS. 1, 8 and 9) are also provided on the exterior of the side panels 16 and on the front panel 14 to permit easy handling of the bag 10.

Figure 8:
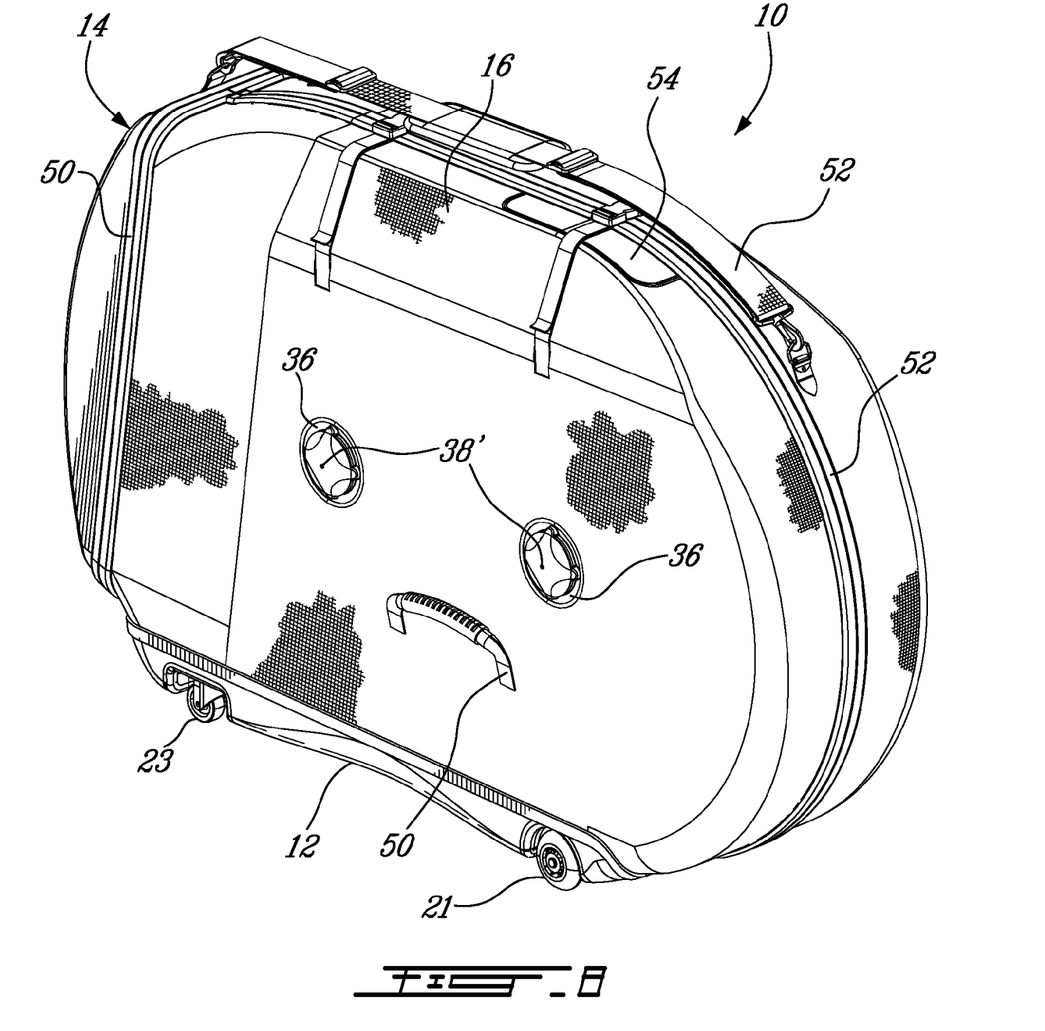
FIG. 8 is a back perspective view of the bicycle bag illustrating the disposition of the shoulder strap, lateral and front handles for carrying the bag.
Figure 9:
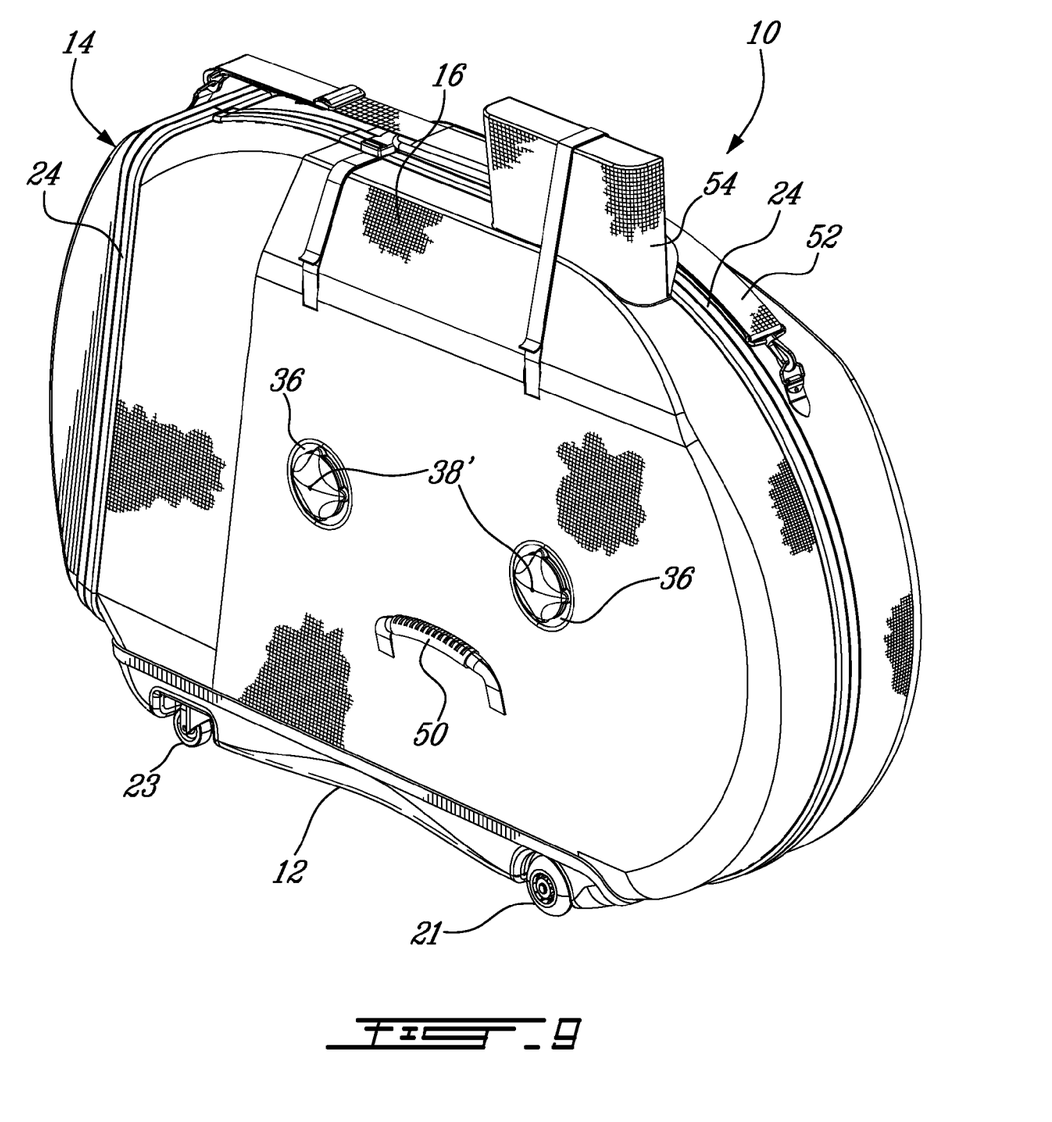
FIG. 9 is a rear perspective view of the bag illustrating a seat post reversible pocket in an extended position for receiving the seat tube portion of a bicycle frame having an integral seat post.
Figure 10:
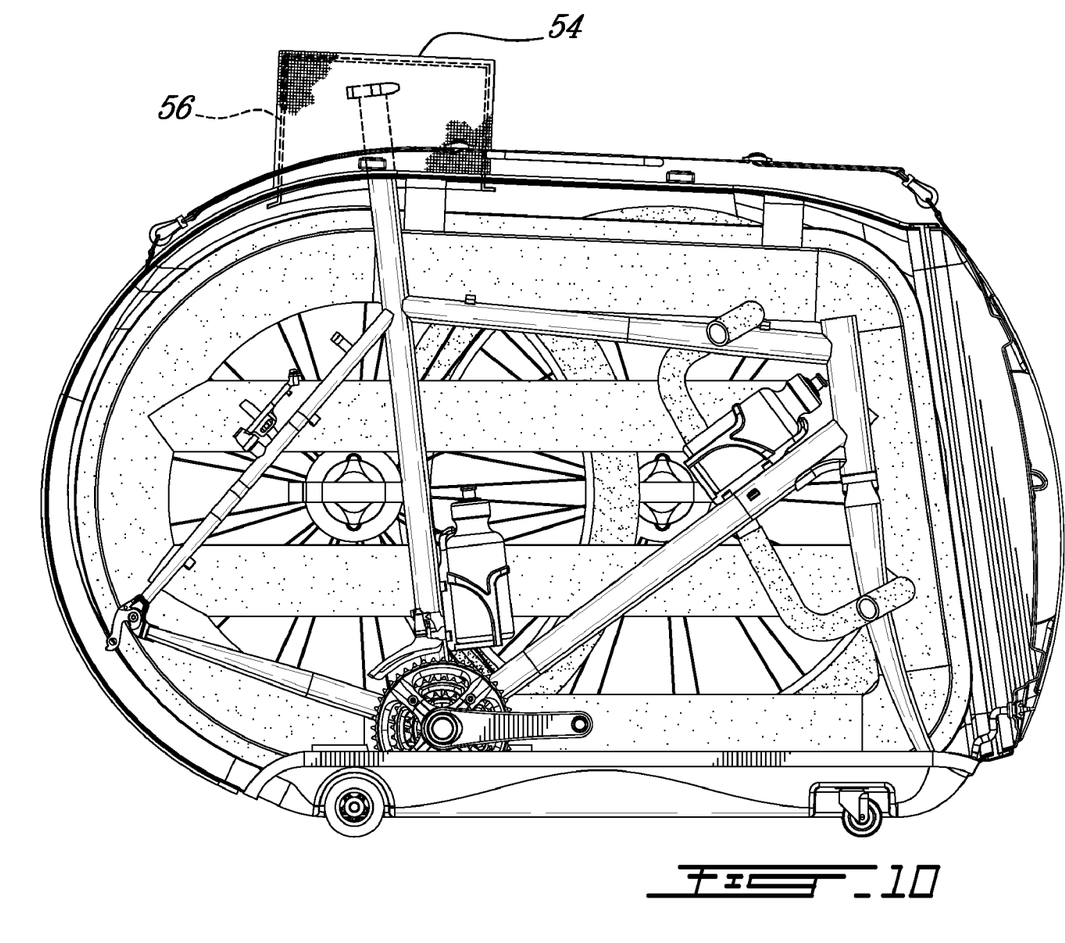
FIG. 10 is a partly cross-sectional side view of the bag illustrating the reversible pocket in an extended position for accommodating the seat post portion of an integrated seat post bicycle frame.

As shown in FIGS. 8, 9 and 10*a*, the bag 10 can also be provided on a top rear surface thereof with a reversible pocket 54 deployable from outside of the bag 10 from a collapsed position (FIG. 8) to an extended position (FIGS. 9 and 10*a*) for accommodating the seat post portion of bicycle frame having integral seat post stem (see FIG. 10). The reversible pocket provides the additional space required to accommodate such integrated seat post bicycle frame. The reversible pocket 54 can be readily expanded by unzipping the zipper running about the a flap covering the pocket on the outside of the bag 10 and then by pulling out the pocket, as shown in FIGS. 9 and 10*a*. Once the pocket 54 has been pulled out, a rigid protector 56 is inserted from within the bag 10 into the pocket 54 in order to protect the seat post. The protector 56 also prevents the seat post from puncturing the pocket 54.

What is claimed is:

1. A bicycle travel/storage bag comprising a base having longitudinally extending left and right sides and front and rear ends, said base being provided on an inner surface thereof with at least one anchor for holding a bicycle frame in an upstanding position on the base, left and right panels extending respectively from said left and right sides of said base, a front panel extending from said front end of said base, and at least one fastener for selectively joining together said right, left and front panels together to close the bag, said left, right and front panels being deployable from a closed position to an open position in which at least the base, the right and left side panels all substantially lie in a same plane with said front panel extending forwardly from the front end of the base and said left and right panels extending respectively laterally from the left and right sides of the base, thereby substantially fully exposing an interior surface of the bag, wherein the front panel is connected to the base and movable relative thereto independently from said left and right panels after having unfastened the fastener to open the bag, wherein said base and said front panel are substantially rigid, whereas said left and right panels are soft and collapsible, and wherein said soft left and right panels are provided with rigid inserts, the rigid inserts being sized and disposed such as to still permit collapsing of the left and right panels, said rigid inserts including wheel anchoring points for releasably securing bicycle wheels on the inner side of the left and right panels.

2. The bicycle travel/storage bag defined in claim 1, wherein said at least one fastener runs along opposed side edges of said front panel.

3. The bicycle travel/storage bag defined in claim 2, wherein said at least one fastener runs substantially longitudinally centrally along a top surface of the bag and downwardly towards said base at the rear of the bag.

4. The bicycle travel/storage bag defined in claim 1, wherein said wheel anchoring points include hub attachments for holding the bicycle wheels by the hub thereof, each of said hub attachments including a rigid cap integrated to a respective one of the left and right panels and a pin projecting inwardly from the inner surface of the respective one of the left and right side panels for engagement in the hub of one of the bicycle wheels.

5. The bicycle travel/storage bag defined in claim 1, wherein the front panel is pivotable away from the base to allow opening of the bag in a substantially T-shaped planar configuration with the front panel extending forwardly from the front end of the base and said left and right panels extending respectively laterally from the left and right sides of the base.

6. The bicycle travel/storage bag defined in claim 1, further comprising cushions positionable between the bicycle frame fixed to the base and the wheels mounted to the inner side of the left and right panels.

7. The bicycle travel/storage bag defined in claim 6, wherein said cushions are inflatable.

8. A bicycle travel/storage bag for receiving a bicycle in a partly disassembled condition, the bicycle having a pair of bicycle wheels and a bicycle frame, the bag comprising a base with a bicycle frame mount for securely holding the bicycle frame in an upstanding position, left and right side panels extending from opposed sides of the base, the left and right side panels being at least partly made from a soft material and having rigid wheel attachments integrated thereto for holding the bicycle wheels on an inwardly facing side of said left and right side panels, and at least one cushion extending on opposed sides of the bicycle frame when the same is held in said upstanding position on said base, the at least one cushion being spaced from the inwardly facing side of the left and right side panels and acting as a bumper between the wheels carried thereon and the bicycle frame, the at least one cushion being inflatable.

9. The bicycle travel/storage bag defined in claim 8, wherein said wheel attachments include fixed hub attachment points to securely retain the wheels on the inwardly-facing side by the hub of the bicycle wheels.

10. The bicycle travel/storage bag defined in claim 8, wherein said at least one cushion comprises first and second air bags respectively foldable over the wheels carried on said left and right side panels.

11. The bicycle travel/storage bag defined in claim 8, comprising a valve accessible from outside of the bag to permit inflation of the at least one cushion after the bag has been closed.

12. The bicycle travel/storage bag defined in claim 8, wherein said base includes a substantially rigid shell having a perimeter defined by two longitudinally extending side edges and two opposed end edges, and wherein said at least one inflatable cushion is disposed within said perimeter to substantially fill the space between the bicycle frame and the wheels inside the bag.

13. The bicycle travel/storage bag defined in claim 8, wherein the base is substantially rigid and wherein the bag further comprises a substantially rigid front panel pivotally mounted to a front end of said substantially rigid base, and a fastener for releasably joining the front, left and right panels together, the left and right side panels being collapsible upon themselves for allowing said substantially rigid front panel to be pivoted over said substantially rigid base in a compact collapsed configuration when the bag is not in use, said rigid wheel attachment being sized and disposed to still permit collapsing of said left and right side panels on the substantially rigid base when the substantially rigid front panel is pivoted thereover.

14. The bicycle travel/storage bag defined in claim 13, wherein said substantially rigid base includes a rigid bottom shell member.

15. The bicycle travel/storage bag defined in claim 8, further comprising a reversible pocket adapted to be pulled out of a top surface of one of the left and right side panels to provide additional space for accommodating bicycle frames with integrated seat post, the reversible pocket being deployable from a collapsed position in which the reversible pocket is stored behind a closure provided on said top surface.

16. The bicycle travel/storage bag defined in claim 15, further comprising a substantially rigid seat post protector adapted to be inserted from within said enclosure into said reversible pocket.

17. The bicycle travel/storage gab defined in claim 15, wherein said reversible pocket is accessible from outside of said enclosure, and wherein said closure comprises a flap extending from the top surface.

18. A bicycle travel/storage bag comprising a base with a bicycle frame mount for securely holding a bicycle frame in an upstanding position, a pair of opposed soft side panels extending from opposed sides of the base, and rigid inserts integrated to said soft side panels, said rigid inserts including at least two hub attachments for releasable securing the bicycle wheels by the hubs thereof to an inner side of at least one of said side panels.

19. The bicycle travel/storage bag defined in claim 18, wherein each hub attachment comprises first and second members for firmly holding the hub of the bicycle wheels in sandwich therebetween.

20. The bicycle travel/storage bag defined in claim 19, wherein said first member includes a first rigid cap integrated to one of said soft side panels, and a first pin extending from said first rigid cap inside the bag, the first pin being dimensioned for insertion in the hub of one of the bicycle wheels.

21. The bicycle travel/storage bag defined in claim 20, wherein the second member has a second cap and a second pin extending from the second cap for engagement into the hub of the one of the bicycle wheels from a side opposite to the side from which the first pin is introduced in the hub of the one bicycle wheel.

22. The bicycle travel/storage bag defined in claim 21, wherein a hook and loop fastener and a strap arrangement is provided for attaching the second cap to the side panels.

23. The bicycle travel/storage bag defined in claim 18, wherein each hub attachment has a male portion extending from an inner surface of said at least one of said soft side panels for engagement in the hub of one of the bicycle wheels.

24. The bicycle travel/storage bag defined in claim 18, wherein said at least two hub attachments defines two fixed wheel mounting points on the inner side of one of said soft side panels, and wherein said two fixed wheel mounting points are spaced such that the wheels overlapped each other once mounted to the inner side of said one of said soft side panels.

25. The bicycle travel/storage bag defined in claim 18, wherein each of said at least two hub attachments comprises a substantially rigid cap integrated to one of said soft side panels, said rigid cap being dimensioned so as to prevent said one of said soft side panels from being damaged by the hub of the bicycle wheel mounted on the inside of said one side panel.

* * * * *